Oct. 18, 1966    C. W. McVEA    3,279,037
METHOD OF ASSEMBLING ELECTRICAL ELEMENTS
Filed Feb. 28, 1963    2 Sheets-Sheet 1

CLARENCE W. McVEA
INVENTOR.

BY R. Frank Smith
David P. Ogden
ATTORNEYS

Oct. 18, 1966  C. W. McVEA  3,279,037
METHOD OF ASSEMBLING ELECTRICAL ELEMENTS
Filed Feb. 28, 1963  2 Sheets-Sheet 2

CLARENCE W. McVEA
INVENTOR.

BY R. Frank Smith
David P. Ogden
ATTORNEYS

United States Patent Office 3,279,037
Patented Oct. 18, 1966

3,279,037
METHOD OF ASSEMBLING ELECTRICAL
ELEMENTS
Clarence W. McVea, Rochester, N.Y., assignor to Eastman Kodak Company, Rochester, N.Y., a corporation of New Jersey
Filed Feb. 28, 1963, Ser. No. 261,766
5 Claims. (Cl. 29—155.5)

This invention relates to an assembly method, and, more particularly, to a method for assembling two conductive members in an electrically insulated supporting relationship.

In the art of electric conductors involving the support of concurrently movable electrically isolated conductors, many complex and cumbersome coupling arrangements are known. However, both the bulk of these systems and the method of assembling these elements leave much to be desired.

Therefore, an object of my invention is to provide a simple and reliable assembly method.

In accordance with one embodiment of my invention, a main support body, because of its environmental operating considerations, is fabricated of a conductive material such as stainless steel or the like, which provides it with suitable bearing and driving surfaces for reliably repeatable operations. A concurrently movable contactor is most conveniently supported by the main body portion. However, the electric circuits coupled to the contactor member must remain isolated from the main body portion. These members, the support body and the contactor, are physically coupled by soldering therebetween a small double-sided circuit board wafer. The double-sided circuit board is one having solder on both sides so that metal parts may be secured to both sides. The steps necessary to accomplish this assembly are to align the three parts in series and then to heat both conductive members to develop a double solder joint therebetween.

The subject matter which is regarded as my invention is particularly pointed out and distinctly claimed in the concluding portion of this specification. The invention, however, as to its organization and operation together with further objects and advantages thereof, will best be understood by reference to the following description taken in connection with the accompanying drawings in which:

Figure 1:
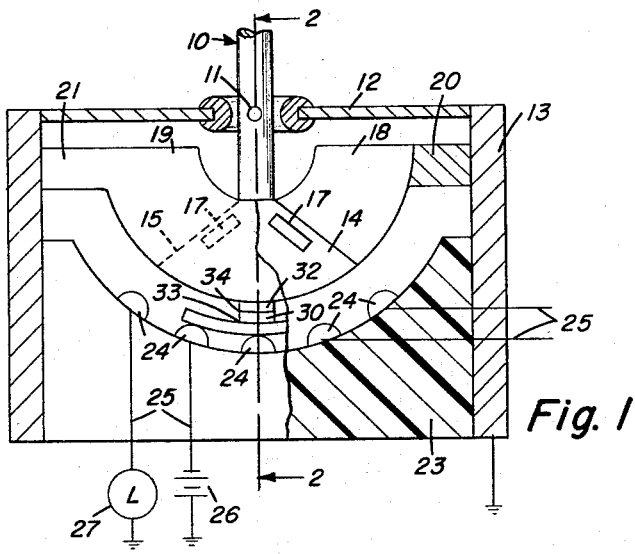
FIG. 1 is a plan view partially in section of an electric conductor apparatus adapted to utilize my invention.

Referring now to the drawings wherein like numbers refer to similar parts, I have shown in FIG. 1 a main body portion or operating lever 10 pivotally supported as by a pin 11 secured to a face plate 12 of an electrically grounded box 13. The main body portion 10 is of a relatively complex configuration being provided with laterally extending wings 14 and 15 having secured thereto resilient brushes 17 which continuously contact guide members 18 and 19. The guide members 18 and 19 are physically supported from and electrically coupled to the grounded box 13 by arms 20 and 21. Thus, the brushes 17 as well as the support arrangement thereof electrically ground the main body portion 10.

Figure 2:
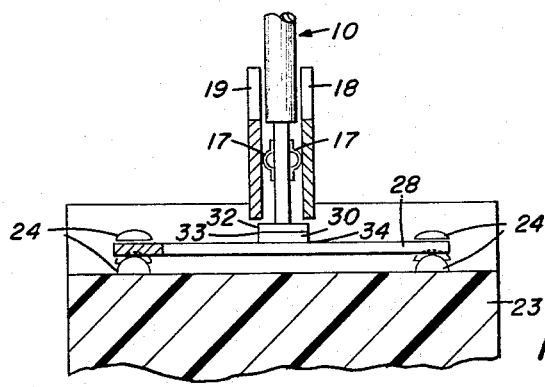
FIG. 2 is a cross-sectional view taken along the line 2—2 of FIG. 1.

As is more easily seen in FIG. 2, the resilient brushes 17 guide the wing portions 14 and 15 within the spacing between the guide portions 18 and 19 to maintain alignment thereof despite rotational forces other than that in connection with the pin 11 which may be applied to the main body portion 10. Also within the grounded box 13 and electrically insulated therefrom by a support 23 are a plurality of contacts 24, each of which is coupled by a lead line 25 to electric circuit components under the control of the main body portion 10. One of the components is a battery 26, and another is a lamp 27 (the others not shown). The control of the circuit components is accomplished by a contactor 28, which, in the instance illustrated here, couples selectively a plurality of the contacts 24 to accomplish co-operation by the components in a preselected manner. By way of example, the battery 26 may energize the lamp 27.

However, the contactor 28, which is a conductive material such as brass, must be electrically insulated from the grounded main body portion 10. Grounding of all of the contacts 24 and especially the battery 26 will not effect coupling of components in a useful manner. In order to prevent undesired grounding of the contactor 28, it is secured to the main body portion 10 by means of a double-sided circuit board wafer 30 being soldered directly to the contactor 28 and to a foot 32 of the main body portion 10. The double-sided circuit board wafer 30 is pretinned and fluxed on both sides 33 and 34 and is a small portion, such as a ¼"-square section, of a double-sided circuit board. Such a circuit board often takes the form of a fiberglass board center having a thickness of the order of 0.01", and having thin copper sheets bonded on each side. The copper sheets are then pretinned and fluxed as is the usual manner of preparing printed-circuit boards. Steel, brass, copper and other metals can then be soldered on either or both sides of the insulating circuit board. In accordance with my invention, such a double-sided circuit board is chopped or sliced into square wafers of about ¼" on a side.

Since the main body portion 10 is resiliently supported to traverse a preselected path within the guides 18 and 19, precise timing of the coupling of the various contacts 24 may be accomplished only if the spacing and the alignment relationship between the contactor 28 and the main body portion 10 is predetermined and is maintained in a fixed relationship. Thus, substantially rigid support therebetween is requisite.

Figure 3:
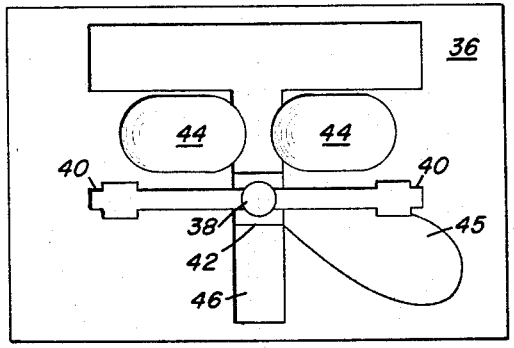
FIG. 3 is a top plan view of a jig or fixture suitable for assembling the movable portions illustrated in FIGS. 1 and 2.

As is well known, the soldering of portions in a predetermined relationship may be accomplished by an assembly jig or fixture of the type illustrated at 36 in FIG. 3. Fixtures of this type are often molded in a preselected form but may be built up in layers or with various positioning pins or may be developed by removing portions of a solid block. The particular fixture illustrated in FIG. 3 is provided with a central aperture 38 to accommodate the long shank of the main body portion 10 and is provided with tapered slots 40 to accommodate the wing portions 14 and 15 and the resilient brushes 17. A central square recess portion 42 is provided to accommodate the foot 32 of the main body portion 10 and to precisely locate thereover the double-sided circuit board wafer 30. There are also provided access recesses in the fixture 36 in the form of finger recesses 44 and probe slots 45 as well as a recess 46 to precisely position the contactor 28.

Figure 4:
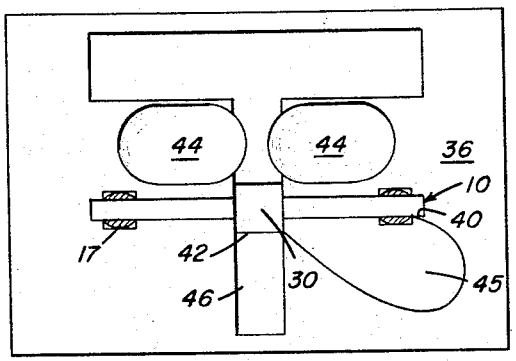
FIG. 4 is a plan view of the fixture shown in FIG. 3 with a portion only of the members positioned therein.

In FIG. 4, the location of the main body portion 10 in the fixture 36 is illustrated with the double-sided circuit board wafer 30 also in position within the square recess portion 42 (indicated in dashed lines). The fixture is so recessed that the top surface of the double-sided circuit board wafer 30 is substantially flush with the lower surface of the recess 46 provided for the contactor 28.

Figure 5:
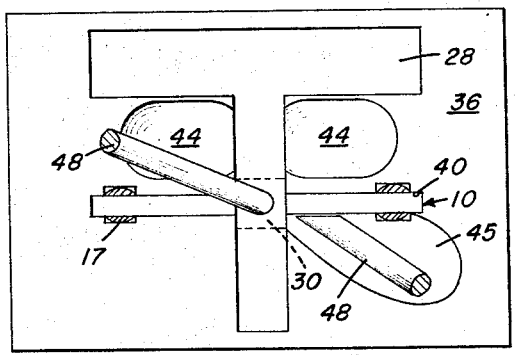
FIG. 5 is a plan view of the fixture of FIG. 3 illustrating a soldering operation.

In FIG. 5, the contactor 28 has also been located in the fixture 36 over both the main body portion 10 and the double-sided circuit board wafer 30 with heating means such as soldering irons 48 being placed in contact with both the main body portion 10 and the contactor 28 so that these portions will be heated sufficiently to activate the flux and melt the solder of the double-sided circuit board wafer 30. Once heating is accomplished sufficient to obtain a firm solder connection, the soldering iron members 48 are removed, and the assembly is allowed to cool without disturbing the alignment thereof. Then the fixture and assembly are moved to another station where another equipment is moved adjacent thereto.

Figure 6:
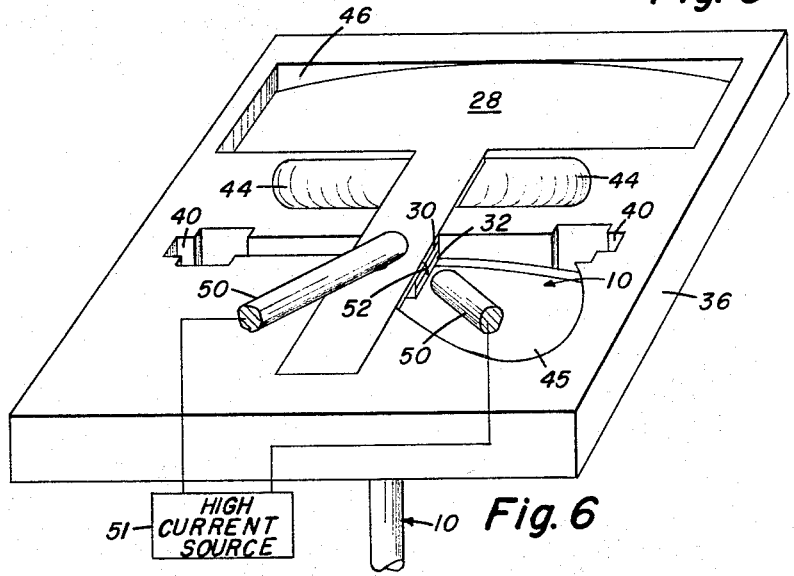
FIG. 6 is a perspective view of the fixture of FIG. 3 illustrating a test-and-clear operation.

In FIG. 6, the other equipment is illustrated as a pair of probes 50 which engage the main body portion 10 and the contactor 28 in a manner effectively the same as the engagement by the soldering irons 48. However, these probes 50 are a portion of a test-and-clear operation being coupled to a high current source 51 so that in the event of any shorting developed by melting of solder as at 52, there will result a concentrated current flow therethrough sufficient to blow the solder 52 therefrom in the manner in which a fuse is blow. Thus, in the event of a short circuit between the main body portion 10 and the contactor 28, this short circuit is automatically cleared so that the finished assembly is ready for use.

Upon completion of the test-and-clear step, the completed assembly is removed from fixture 36 as by grasping the contactor 28 in the region of the finger recesses 44. Once a completed assembly is removed from the fixture 36, the fixture is ready for reuse.

While I have shown and described particular embodiments of the present invention, other modifications may occur to those skilled in this art. I intend, therefore, to have the appended claims cover all modifications which fall within the true spirit and scope of my invention.

I claim:

1. A method for supportingly coupling two electrically insulated conductors by means of a double-sided non-conducting circuit board wafer having solder on both sides thereof, comprising the steps of:

assembling a conductive main body portion as one of the two conductors, the double-sided circuit board wafer and a contactor as the other of the two conductors in a predetermined contacting location such that the main body portion and the contactor substantially cover opposite sides of the wafer and there is no direct electrical contact between the body portion and the contactor; and heating both the main body portion and the contactor in proximity with the wafer sufficiently to melt solder thereon.

2. A method for securing two electrically insulated conductors by means of a thin double-sided and tinned non-conducting circuit board wafer, comprising the steps of:

positioning a first conductor with a flat surface exposed;

placing the wafer so that it substantially covers the exposed surface of the first conductor;

placing a second conductor on the wafer so that it substantially cover the wafer and there is no direct electrical contact between the first and second conductors;

heating both the first and second conductors in proximity with the wafer sufficiently to melt solder thereon; and allowing sufficient cooling for the melted solder to solidify.

3. A method for supportingly coupling as in claim 1 having the further step of:

allowing sufficient cooling for the melted solder to solidify while maintaining said predetermined location.

4. A method for securing two electrically insulated conductors as in claim 2 including the further step of:

coupling the first and second conductors in series with a high current source to force a large electric current through any residual solder shunt in the region of the wafer to vaporize a least a portion of such shunt.

5. A method for securing two electrically insulated conductors as in claim 2 including the further step of:

supportingly attaching the first conductor in a utilization device whereby the second conductor is supported therewith.

References Cited by the Examiner

UNITED STATES PATENTS

| 2,139,469 | 12/1938 | Sachse | 29—473.1 X |
| 2,909,710 | 10/1959 | Platt | 317—101 |
| 2,934,814 | 5/1960 | Williams et al. | 29—155.5 |
| 3,055,465 | 9/1962 | Pulfrich | 29—473.1 X |
| 3,059,152 | 10/1962 | Khouri | 317—101 |
| 3,079,672 | 3/1963 | Bain | 29—155.5 |
| 3,097,418 | 7/1963 | Valliere | 29—155.5 |

JOHN F. CAMPBELL, *Primary Examiner.*

WILLIAM I. BROOKS, C. I. SHERMAN,
*Assistant Examiners.*